United States Patent
Kirchhoff (10) Patent No.: US 9,053,561 B2
(45) Date of Patent: Jun. 9, 2015

(54) SYSTEM AND METHOD FOR WORKPIECE MEASUREMENT DURING FORGING BY IMAGE PROCESSING

(75) Inventor: Stefan Kirchhoff, Dortmund (DE)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 280 days.

(21) Appl. No.: 13/428,501

(22) Filed: Mar. 23, 2012

(65) Prior Publication Data

US 2013/0251239 A1 Sep. 26, 2013

(51) Int. Cl.
G06K 9/00 (2006.01)
G06T 7/60 (2006.01)
G01B 11/02 (2006.01)

(52) U.S. Cl.
CPC ............ G06T 7/602 (2013.01); G01B 11/02 (2013.01); G06T 2207/30164 (2013.01); G06T 2207/30208 (2013.01)

(58) Field of Classification Search
CPC ............ G06K 9/36; G06T 7/60; G06T 7/602; B21C 51/00; B21J 9/00; B21J 1/04
USPC .................................................. 382/141–152
See application file for complete search history.

(56) References Cited

U.S. PATENT DOCUMENTS

| | | | |
|---|---|---|---|
| 4,601,186 A * | 7/1986 | Kunzli et al. ................. 72/20.1 |
| 5,028,798 A * | 7/1991 | Biswas et al. ............ 250/559.21 |
| 5,828,028 A * | 10/1998 | Cecil ............................. 219/110 |
| 5,917,726 A | 6/1999 | Pryor |
| 6,217,678 B1 * | 4/2001 | Momozaki et al. ........... 148/598 |
| 7,230,724 B2 * | 6/2007 | Jokinen et al. ................ 356/608 |
| 7,281,402 B2 | 10/2007 | Kirchhoff |
| 2005/0247092 A1 * | 11/2005 | Kirchhoff ...................... 72/16.7 |
| 2008/0047804 A1 * | 2/2008 | Rathbun et al. ............ 198/502.1 |
| 2010/0118137 A1 | 5/2010 | Avila et al. |
| 2010/0310128 A1 | 12/2010 | Iliopoulos et al. |

FOREIGN PATENT DOCUMENTS

JP 53143254 A 12/1978

OTHER PUBLICATIONS

PCT International Search Report and Written Opinion of the ISA dated Mar. 26, 2013 for counterpart PCT application No. PCT/US2013/023546.

(Continued)

*Primary Examiner* — Aaron W Carter
(74) *Attorney, Agent, or Firm* — Leon Nigohosian, Jr.

(57) ABSTRACT

The amount of elongation of a workpiece during forging can be determined by image processing to calculate the total amount of horizontal movement of marked patterns such as forging scale on the ends of the workpiece which move away from a forging bite during the forging blow. Images of marked patterns before and after a forging blow on both sides of the bite of a forging die are compared to determine the movement of the marked patterns and thus the movement of the ends of the workpiece. A method and system of determining the elongation and vertical displacement of a workpiece during forging is disclosed.

15 Claims, 7 Drawing Sheets

(56) References Cited

OTHER PUBLICATIONS

Zhenyuan Jia, Bangguo Wang, Wei Liu, Yuwen Sun, "An Improved Image Acquiring Method for Machine Vision Measurement of Hot Formed Parts", Journal of Materials Processing Technology 210 (2010) pp. 267-271, Elsevier.

T.J. Nye, A. M. Elbadan, G. M. Bone, "Real-Time Process Characterization of Open Die Forging for Adaptive Control," Journal of Engineering Materials and Technology, Oct. 2001, vol. 123 pp. 511-516 Copyright 2001 by ASME.

* cited by examiner

SYSTEM AND METHOD FOR WORKPIECE MEASUREMENT DURING FORGING BY IMAGE PROCESSING

The present invention relates to measurement of forging workpieces. The determination of the increase in length of a workpiece during forging is an important parameter.

Previously, during forging, forging workpieces were measured by connecting a steel cable to the end of forging piece, and measuring the length variation of the steel cable. Such a method of measuring a forging workpieces is possible on a temporary basis such as during trials in a forge. However, connecting and disconnecting a steel cable to measure a workpiece is not acceptable in normal daily operation because it can take too much time and can be dangerous. Also, permanent installation of steel cables for measuring forging pieces is not possible.

In many forging plants, observing both ends of the workpiece is generally difficult. Measurement of the workpiece using visual or by laser scanning methods is not possible because the forging workpiece ends may be hidden by a manipulator which is in addition to the die. The workpiece ends also can change their sideward positions and can have a deformed end surface which all together lead to distance measurement errors.

SUMMARY OF THE INVENTION

In some embodiments, the present invention is directed to a method and system for determining the elongation of a workpiece during forging of the workpiece, such as before and after a forging blow on the workpiece by image processing.

In some embodiments, the present invention is directed to a method and system for determining the change in the measured length of a workpiece during forging of the workpiece by image processing.

In some embodiments, the present invention is directed to a method and system for determining the vertical displacement of a workpiece during forging of the workpiece such as before and after a forging blow on the workpiece by image processing.

In some embodiments, the present invention is directed to a method and system for both determining the elongation of a workpiece and for determining the vertical displacement of a workpiece during forging, such as before and after a forging blow on the workpiece by image processing.

In some embodiments, the present invention is directed to a method and system for determining the elongation of a workpiece by processing two, three, four or more images of the elongation of the workpiece during a single forging blow on the workpiece by image processing.

In some embodiments, the present invention is directed to a method and system for determining the vertical displacement of a workpiece by processing two, three, four or more images of the vertical displacement of the workpiece during a single forging blow on the workpiece by image processing.

In some embodiments, the present invention is directed to a method and system for determining the actual increase in the elongation of a workpiece in standard measurement units during forging of the workpiece from before as compared to after a forging blow on the workpiece by image processing images taken by an image acquiring device of scanned areas on two ends of the workpiece and by determining the distance to the scanned areas on the workpiece using a distance measuring means.

DETAILED DESCRIPTION OF THE INVENTION

The invention is best understood by reference to the accompanying drawings in which like reference numbers refer to like parts. It is emphasized that, according to common practice, the various dimensions of the component parts of the apparatus as shown in the drawings are not to scale and have been enlarged for clarity. Also, the directional designations "left" or "right" are not to be construed as limited to any specific orientation but, rather, are for reference purposes as they pertain to the views as shown in the drawing figures.

In some embodiments, the present invention is directed to a method and system for determining the elongation of a workpiece during forging of the workpiece, such as before and after a forging blow on the workpiece by image processing.

Distributed patterns or marks occur on the forging workpiece surface during forging. The marks or mark patterns can be caused by oxidation and is known as forging scale. Deformation during forging can lead to partial spoiling of the oxide layer. Outside the forging area which is working by the forging dies, that is, left and right of the forging saddle, these marks, mark patterns or structures remain constant before and after one single stroke or blow by the forging dies during the pressing operation.

Figure 1:
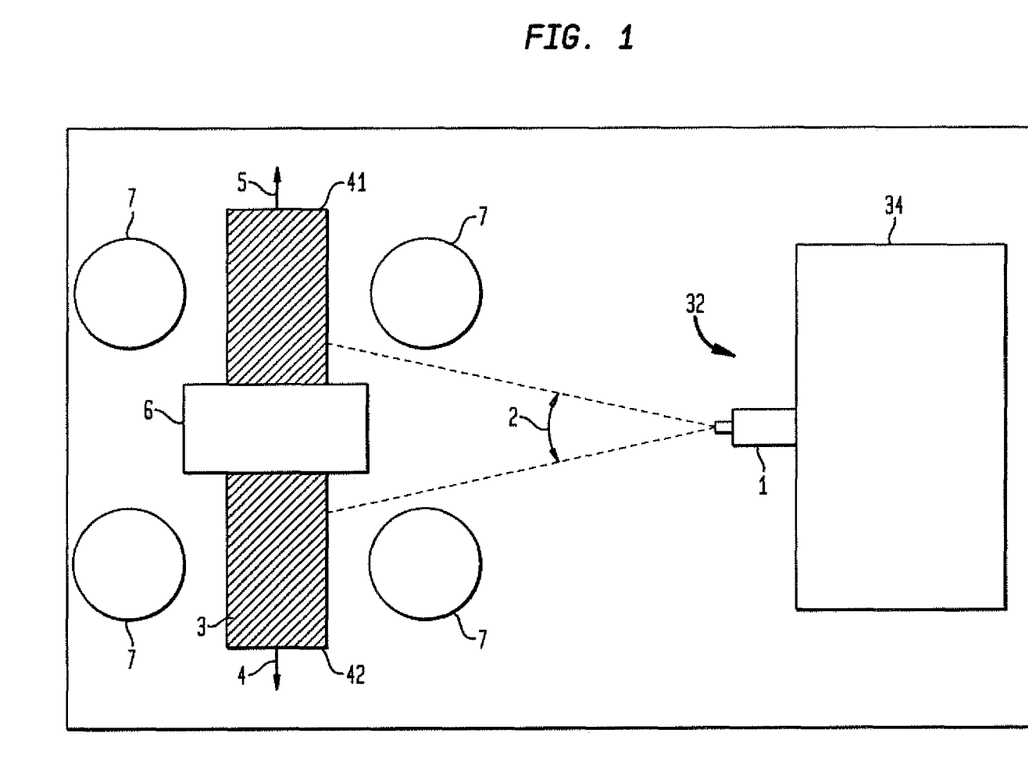
FIG. 1 is a plan view of an open die forging plant showing a workpiece in an open die and a digital camera.

A typical plan view of a forging operation is shown in FIG. 1 showing a workpiece 3 and press columns 7 and here, an upper die 6. The present system for elongation measurement of a workpiece during forging has a means for acquiring an image 1, here, a digital camera and has a view of the actual forging operation shown by digital camera view 2. Elongation direction 4 and elongation direction 5 is shown in FIG. 1 which is the direction each of the ends of the workpiece 3 will elongate during a forging blow. It can be seen that the distal ends 41, 42 of the workpiece 3 cannot be viewed by the digital camera due to the presence of press columns 7.

A mark pattern on the side of the workpiece in the area between a distal end of an end of a workpiece and the prospective forging location or area on the side of the workpiece which is worked by forging dies, such as upper and lower dies, moves in the elongation direction of that end of the workpiece by the same amount or distance as the distal end of that end of the workpiece moves during the forging operation. Also a mark pattern on the side of the workpiece in the area between the distal end of the workpiece and the prospective forging area on the side of the workpiece which is worked by a forging blow, such as between the upper and lower forging dies, moves in the vertical direction by the same amount or distance as the distal end of that end of the workpiece moves during the forging operation. Thus, the amount of elongation of the workpiece can be calculated by summing the amount of movement of the mark patterns on both sides of a bite of a forging die.

The above described effect can be evaluated by using a system for workpiece measurement during forging by image processing. The system has a means for acquiring images which can be a digital camera or CCD camera which takes an image of areas having a particular marked pattern between the distal end of an end of the workpiece and the prospective forging area of a workpiece.

Figure 2:
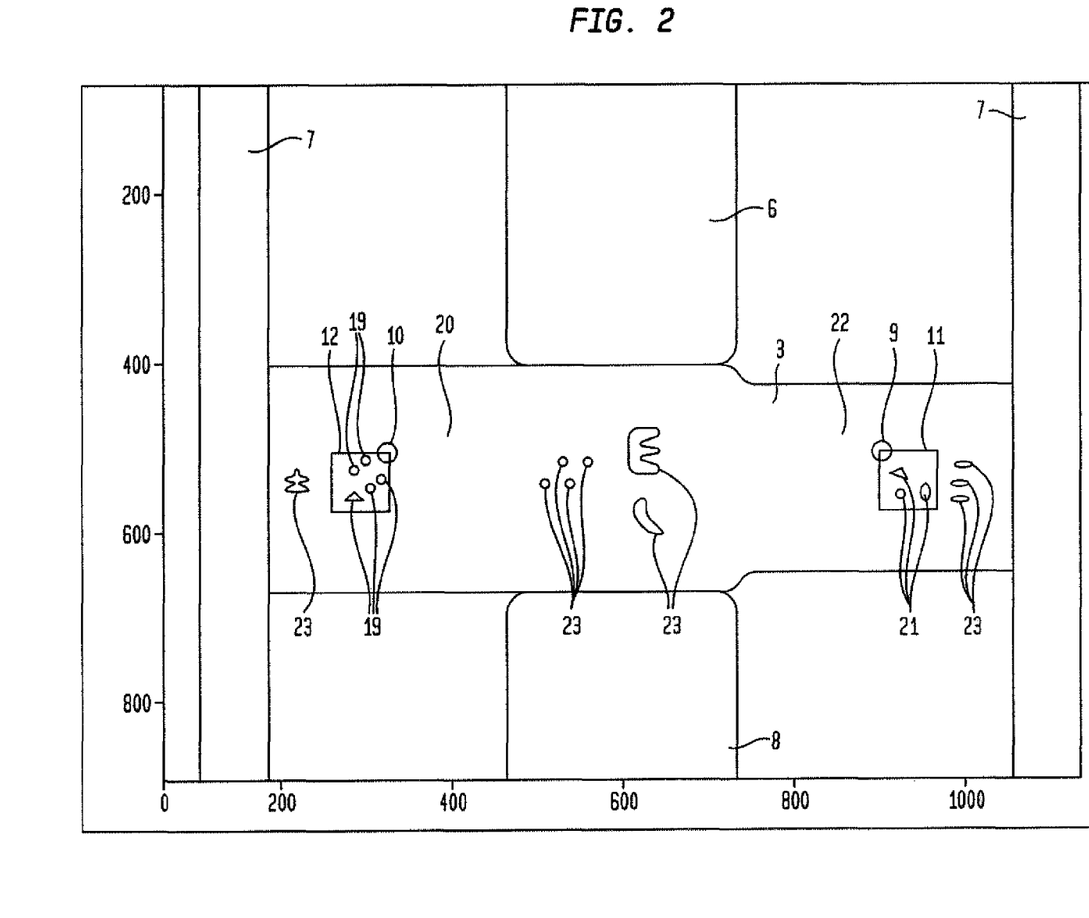
FIG. 2 is a side view of an open forging die and a workpiece showing left scanned area and right scanned area on the workpiece having specific patterns of forging scale prior to a forging blow.

As seen in FIG. 2, a first image can be taken or acquired of a first scanned area 12 of workpiece 3 having a first mark pattern 19 between a distal end (not shown) of a first end 20 of a workpiece 3 and the prospective forging area between upper die 6 and lower die 8 of the workpiece 3 before a forging blow on the workpiece 3. A second image can be made of a second scanned area 11 of workpiece 3 having second mark pattern 21 between a distal end (not shown) of a second end 22 of the workpiece 3 and the prospective forging area of the workpiece before a forging blow on the workpiece. It can be seen that other patterns or marks 23 on the workpiece 3 are not scanned as part of the first scanned area 12 and the second scanned area 11.

Figure 3:
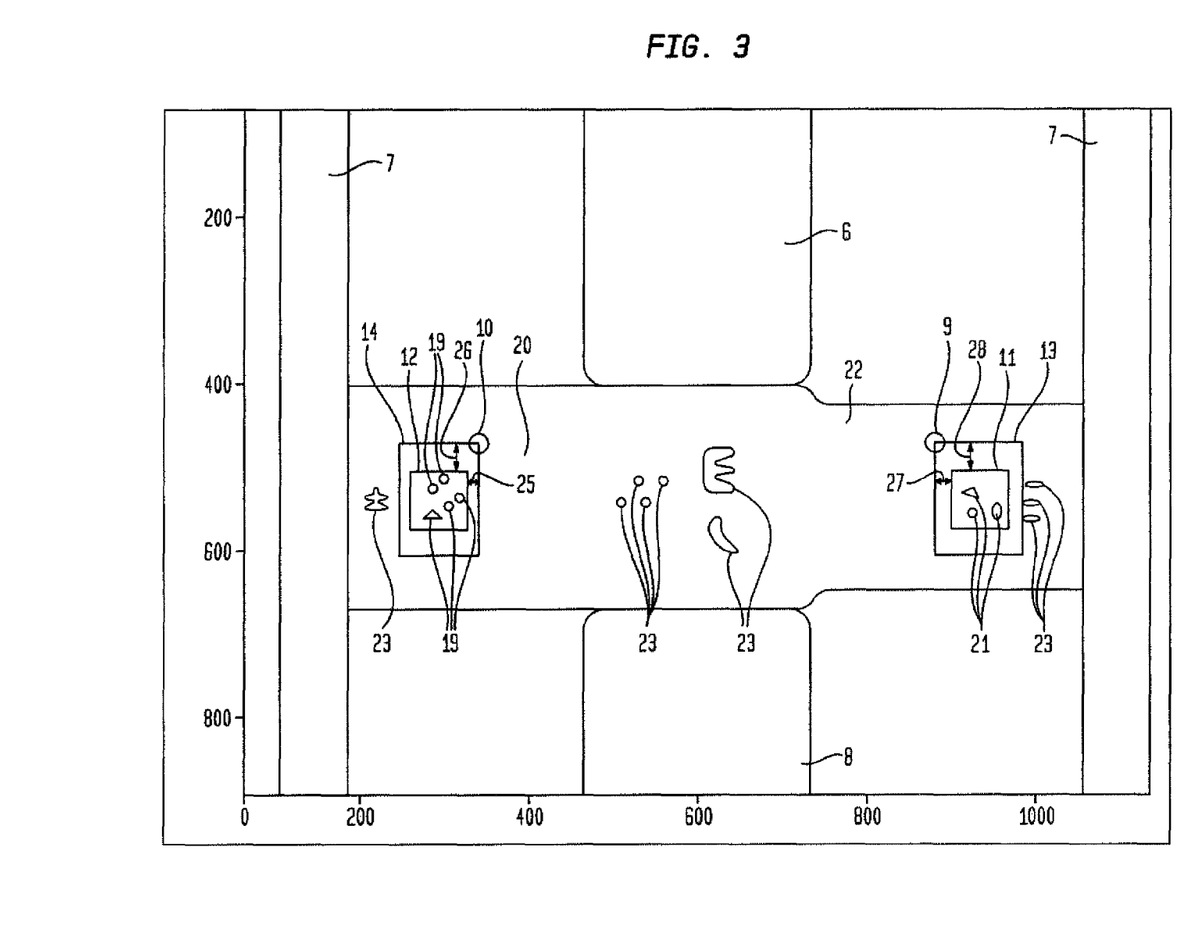
FIG. 3 is a side view of an open forging die and a workpiece showing the vertical movement and horizontal movement of left scanned area and right scanned areas on the workpiece each having specific patterns before and after the forging blow.

After the forging blow as seen in FIG. 3, a third image can be taken of a third scanned area 14 of workpiece 3 which includes at least part of the first scanned area 12 having the first mark pattern 19 between the distal end of the first end 20 of the workpiece 3 and the forged area of the workpiece 3. Here, the third scanned area 14 of workpiece 3 includes the entire first scanned area 12 which has first mark pattern 19. A fourth image can be made of the fourth scanned area 13 of workpiece 3 which includes at least part of the second scanned area 11 of workpiece 3 having second mark pattern 21 between the distal end of the second end 22 of the workpiece 3 and the forged area of the workpiece 3.

As seen in FIG. 3, by correlating the location of the first mark pattern 19 in the first image relative to the location of the first mark pattern 19 in the third image by reference to a reference point, here first scanned area corner location 10 which is also the third scanned area corner location 10, the relative movement of the first scanned area 12 from before the forging blow to after the forging blow can be determined. The horizontal movement 25 and the vertical movement 26 of the first end 20 of workpiece 3 from before the forging blow to after the forging blow can be determined.

Similarly, as seen in FIG. 3, by correlating the location of the second mark pattern 21 in the second image relative to the location of the second mark pattern 21 in the fourth image by reference to a reference point, here second area corner location 9 which is also the fourth scanned area corner location 9, the relative movement of the second scanned area 11 from before the forging blow to after the forging blow can be determined. The horizontal movement 27 and the vertical movement 28 of the second end 22 of workpiece 3 from before the forging blow to after the forging blow can be determined.

Figure 6:
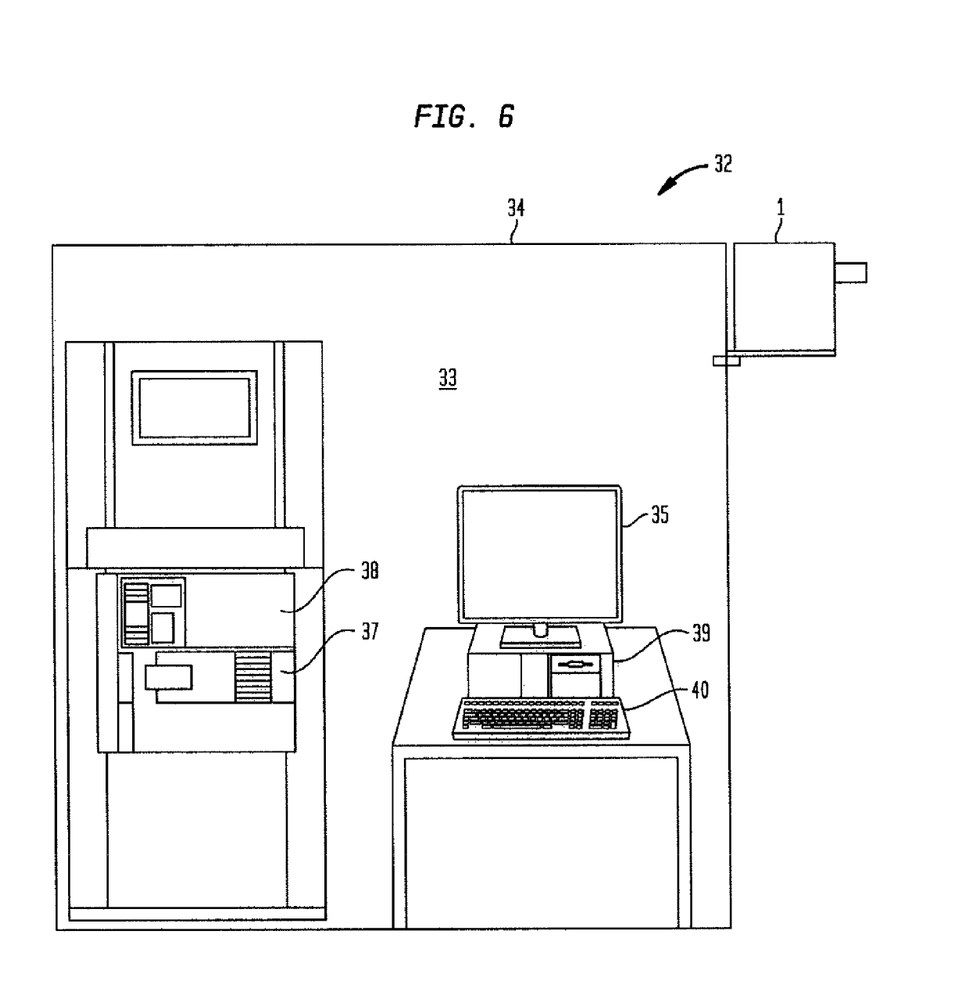
FIG. 6 is a side view of an image processing system for processing images of the left scanned area and right scanned area.

Image processing software or a computer program which is being run in the supporting equipment 33 seen in FIG. 6 correlates the movement of the mark patterns in images of the scanned areas on the ends of the workpiece. This solution is able to create an accurate and reproducible elongation measurement of the workpiece 3 during forging.

The first image of first scanned area 12 having first mark pattern 19 is converted into a matrix which can be stored in a central processing unit 37 seen in FIG. 6. Similarly, the third image of third scanned area 12 having first mark pattern 19 which includes at least part of first scanned area 12 having first mark pattern 19 is also converted into a matrix which can be stored in a central processing unit 37.

The conversion into a matrix of the first image of the first scanned area 12 and the third image of third scanned area 14 and the determination of the horizontal and vertical movement of the first mark pattern 19 seen in the first image and third image is performed by suitable image processing routines or algorithms. These routines basically consist of 1) a step of preprocessing the first image of the first scanned area 12 and the third image of the third scanned area 14, and 2) a correlating step which finds the relative pixel position of image data in the matrix corresponding to the first scanned area 12 best fits the image data in the matrix corresponding to the third scanned area 14.

Figure 4:
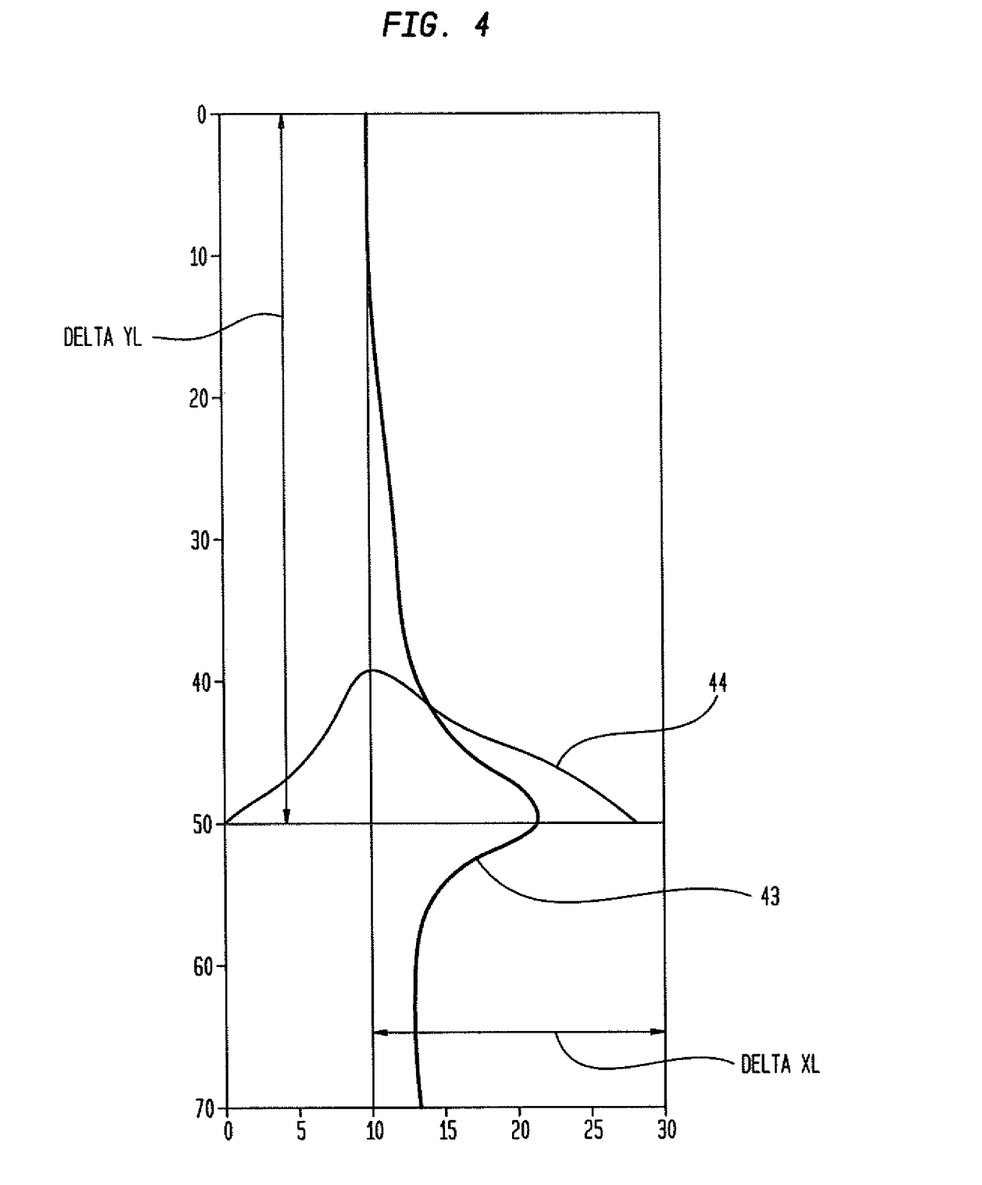
FIG. 4 is a chart showing the result of correlation computing of the left scanned area after a forging blow to determine the vertical movement and horizontal movement of the left scanned area as shown with arrows at the maximum correlation.

For example, as seen in FIG. 4 when the above described correlating step is performed on the image data in the matrix corresponding to the first scanned area 12 and the image data in the matrix corresponding to the third scanned area 14 the maximum correlation as determined by the quality of the left horizontal response 44 occurs when the shift or change in horizontal movement of first scanned area goes from 30 to 10 units of length as shown by DELTA XL. Also as seen in FIG. 4 when the above described correlating step is performed on the image data in the matrix corresponding to the first scanned area 12 and the image data in the matrix corresponding to the third scanned area 14 the maximum correlation as determined by the quality of the left vertical response 43 occurs when the shift or change in vertical movement of first scanned area goes from 0 to 50 units of length as shown by DELTA YL.

Figure 5:
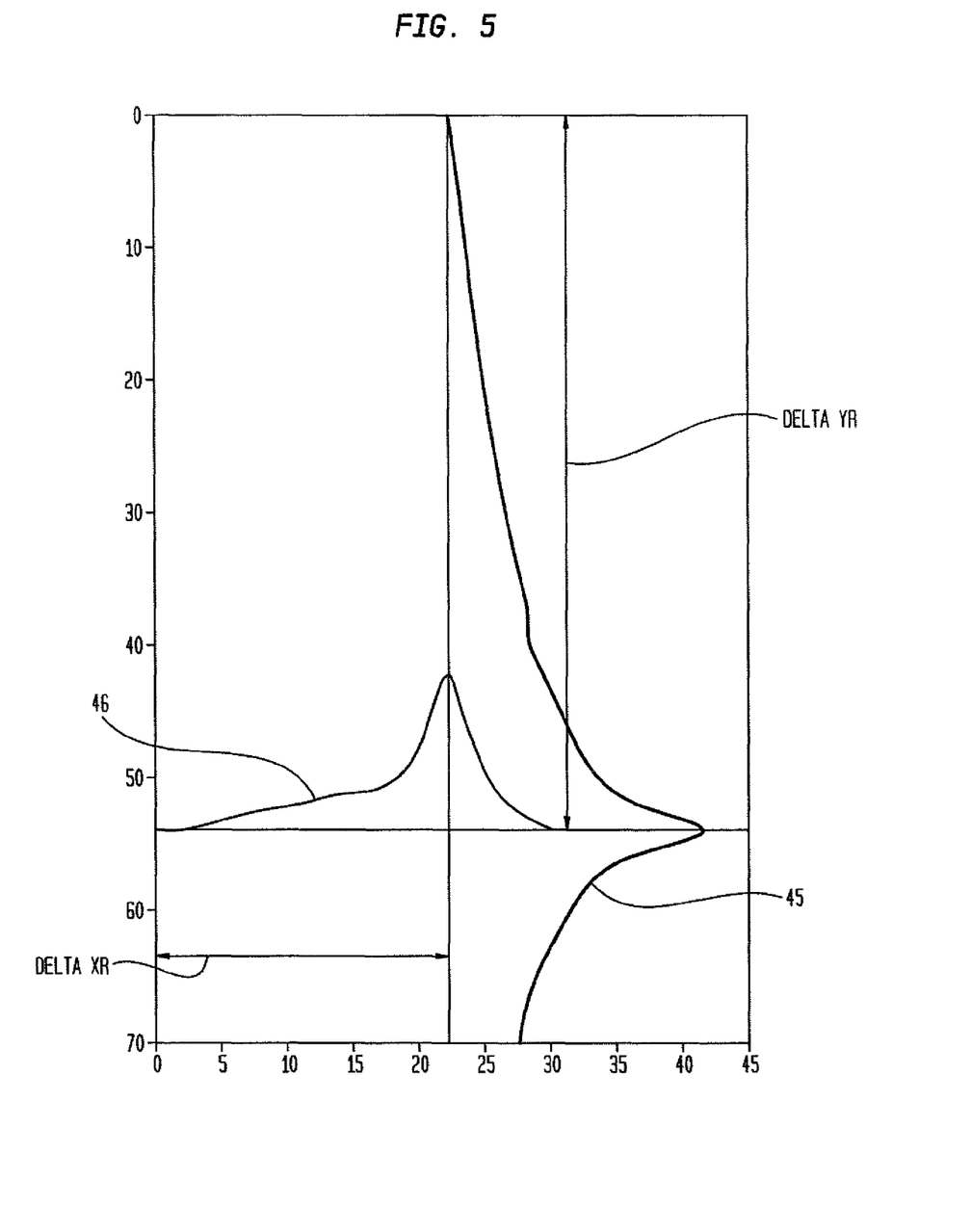
FIG. 5 is a chart showing the result of correlation computing of the right scanned area after a forging blow to determine the vertical movement and horizontal movement of the right scanned area as shown with arrows at the maximum correlation.

Similarly, as seen in FIG. 5 when the above described correlating step is performed on the image data in the matrix corresponding to the second scanned area 11 and the image data in the matrix corresponding to the fourth scanned area 13 the maximum correlation as determined by the quality of the right horizontal response 46 occurs when the shift or change in horizontal movement of second scanned area goes from 0 to 22 units of length as shown by DELTA XR. Also as seen in FIG. 5 when the above described correlating step is performed on the image data in the matrix corresponding to the second scanned area 11 and the image data in the matrix corresponding to the fourth scanned area 13 the maximum correlation as determined by the quality of the right vertical response 45 occurs when the shift or change in vertical movement of first scanned area goes from 0 to 54 units of length as shown by DELTA YR.

The relative change in pixel position of the first image and third images in the direction of elongation can be directly converted to an actual measurement in standard measurement units such as meters or millimeters if the distance between the camera and the side of the workpiece is known. Therefore the elongation of the workpiece 3 in the left direction can be determined or calculated by image processing which correlates the first image of the first scanned area 12 before the forging blow having a first mark pattern 19 with the third image of the third scanned area 14 after the forging blow.

Similarly, the relative change in pixel position of the second and fourth images in the direction of elongation can be directly converted to an actual measurement in standard measurement units such as meters or millimeters if the distance between the camera and the side of the workpiece is known. Therefore the elongation of the workpiece 3 in the right direction can be determined or calculated by image processing which correlates the second image of the second scanned area 13 before the forging blow having a second mark pattern 21 with the fourth image of the fourth scanned area after the forging blow.

The system for elongation measurement of a workpiece during forging 32 of FIG. 6 uses a means for acquiring an image 1 that is connected to supporting equipment 33 located within a control room 34. As seen from FIG. 6, the supporting equipment 33 uses a computer monitor 35, a central processing unit 37, and interfacing electronics 38. A workstation 39, which employs a keyboard or other command entry means 40, linked to the supporting equipment 33 is also provided. Means for acquiring an image 1, supporting equipment 33, and software for effecting the contactless measurement during forging of a workpiece and consequential computation of its dimension and/or shape are commercially available from the FERROTRON division of Minteq International Inc. located at Duisburg, Germany.

The means for acquiring an image is preferably digital camera such as a CCD camera. The camera can have automatic gain control.

In some embodiments, the present invention is directed to a method and system for determining the change in the measured length of a workpiece during forging of the workpiece by image processing.

In some embodiments, the present invention is directed to a method and system for determining the vertical displacement of a workpiece during forging of the workpiece such as before and after a forging blow on the workpiece by image processing.

Figure 7:
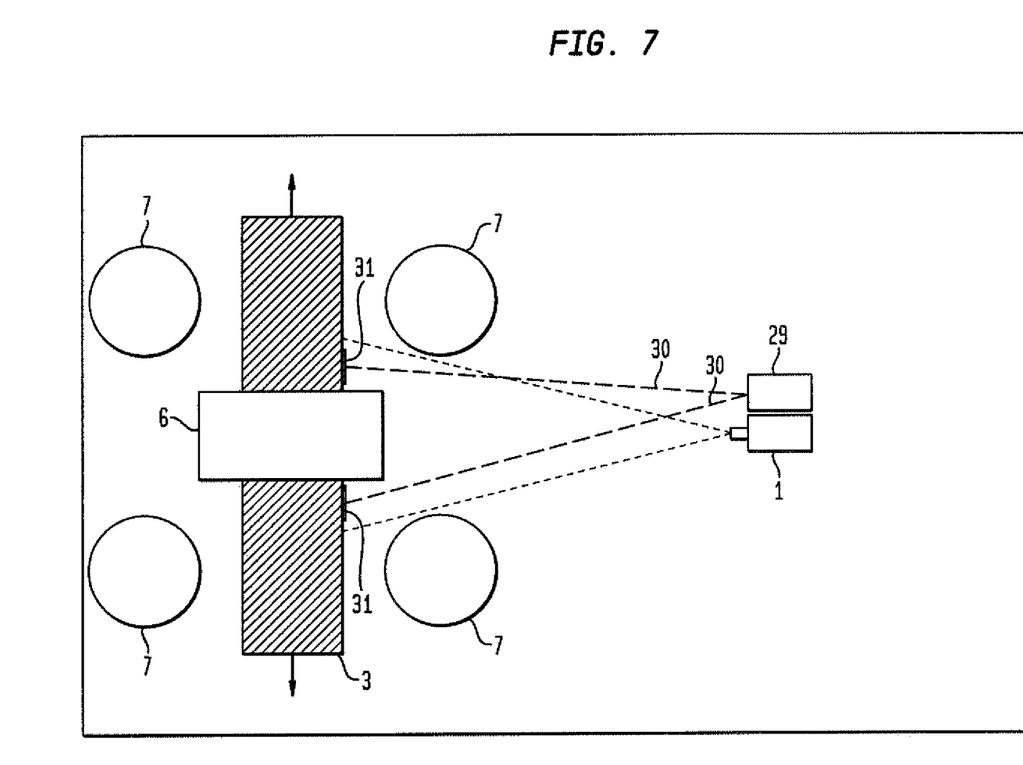
FIG. 7 is a plan view of an open die forging plant showing a workpiece in an open die and a digital camera and laser range finder.

In some embodiments, the present invention is directed to a method and system for determining the actual measurement of vertical displacement of a workpiece during forging of the workpiece such as before and after a forging blow on the workpiece by image processing. The measurement can be in standard units such as meters or inches. As seen in FIG. 7, a device for measuring distance such as laser range finder 29 can determine the distance 30 to the workpiece side 31, say in inches or meters. The means for acquiring the first image, second image, third image and fourth image can be positioned to the side of the workpiece 3 such as perpendicular to the workpiece 3. If the location of the device for measuring distance is known relative to the means for acquiring the first image, second image, third image and fourth image, then the actual horizontal and/or vertical movement of the ends 20, 22 of the workpiece 3 can be calculated. Accurate measurements of the elongation of the workpiece 3 can be made because as seen in FIG. 1, the elongation direction 4, 5 of the first end 20 and second end 22 of workpiece 3 is perpendicular to the viewing direction of means for acquiring an image 1.

In some embodiments, the present invention is directed to a method and system for both determining the elongation of a workpiece and for determining the vertical displacement of a workpiece during forging, such as before and after a forging blow on the workpiece by image processing.

In some embodiments, the present invention is directed to a method and system for determining the elongation of a workpiece by processing two, three, four or more images of the elongation of the workpiece during a single forging blow on the workpiece by image processing.

In some embodiments, the present invention is directed to a method and system for determining the vertical displacement of a workpiece by processing two, three, four or more images of each of the ends of the workpiece to determine the vertical displacement of the workpiece during a single forging blow on the workpiece by image processing. If the vertical displacement or horizontal displacement of the workpiece is measured as explained above as a function of time, then the forging process can be analyzed in more detail such as to investigate short time dynamics. Two, three, four or more than four images of an end or each end of a workpiece can be acquired during a forging blow and processed as described above. The method may be fully automated such that upon a signal from the forging apparatus, the system for elongation measurement automatically takes two, three, four or more images of mark patterns in scanned areas of the ends of a workpiece during a forging blow.

In some embodiments, the present invention is directed to a method and system for determining the elongation of a workpiece by determining the position and size of the first scanned area and second scanned area based on the workpiece height prior to acquiring the first image of the first scanned area and second image of the second scanned area. For example, the height of the workpiece at a prospective forging location can be given by the forging apparatus which operates the forging die. Then, based on the known height of the workpiece at the prospective forging location an optimum location on the ends of the workpiece for the first scanned area and second scanned area which have mark patterns can be determined.

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

I claim:

1. A method for elongation measurement of a workpiece during forging comprising:

acquiring a first image of a first scanned area having a first mark pattern on a side of the workpiece between a distal end of a first end of the workpiece and a prospective forging location before a forging blow;

acquiring a second image of a second scanned area having a second mark pattern on a side of the workpiece between a distal end of a second end of the workpiece and the prospective forging location before the forging blow;

acquiring a third image of a third scanned area including at least a portion of the first scanned area having the first mark pattern on the side of the workpiece between the distal end of the first end of the workpiece and a forging location after the forging blow;

acquiring a fourth image of a fourth scanned area including at least a portion of the second scanned area having the second mark pattern on the side of the workpiece between the distal end of the second end of the workpiece and the forging location after the forging blow;

determining a relative horizontal movement of the first end of the workpiece by correlating a horizontal position of the first mark pattern in the first image relative to a horizontal position of the first mark pattern in the third image;

determining a relative horizontal movement of the second end of the workpiece by correlating a horizontal position of the second mark pattern in the second image relative to a horizontal position of the second mark pattern in the fourth image; and calculating an elongation of the workpiece wherein the elongation of the workpiece is a sum of the relative horizontal movement of the first end of the workpiece and the relative horizontal movement of the second end of the workpiece.

2. The method for elongation measurement of a workpiece during forging of claim 1 wherein the third scanned area includes the entire first scanned area having the first mark pattern and the fourth scanned area includes the entire second scanned area having the second mark pattern.

3. The method for elongation measurement of a workpiece during forging of claim 1 further comprising the steps of:

determining a relative vertical movement of the first end of the workpiece by correlating a vertical position of the first mark pattern in the first image relative to a vertical position of first mark pattern in the third image;

determining a relative vertical movement of the second end of the workpiece by correlating a vertical position of the second mark pattern in the second image relative to a vertical position of the second mark pattern in the fourth image.

4. The method for elongation measurement of a workpiece during forging of claim 3 wherein the third scanned area includes the entire first scanned area having the first mark pattern and the fourth scanned area includes the entire second scanned area having the second mark pattern.

5. The method for elongation measurement of a workpiece during forging of claim 1 further comprising:

determining a distance to the side of the workpiece having the first mark pattern and the second mark pattern, wherein calculating the elongation of the workpiece is based on the determination of the distance to the side of the workpiece having the first mark pattern and the second mark pattern.

6. The method for elongation measurement of a workpiece during forging of claim 3 further comprising the steps of:

determining a distance to the side of the workpiece having the first mark pattern and the second mark pattern, wherein calculating the elongation of the workpiece is based on the determination of the distance to the side of the workpiece having the first mark pattern and second mark pattern;

determining the relative vertical movement of the first end of the workpiece based on the determination of the distance to the side of the workpiece having the first mark pattern and second mark pattern; and determining the relative vertical movement of the second end of the workpiece based on the determination of the distance to the side of the workpiece having the first mark pattern and second mark pattern.

7. The method for elongation measurement of a workpiece during forging of claim 1 further comprising the steps of:

determining a position and a size of the first scanned area and the second scanned area based on a workpiece height prior to acquiring the first image of the first scanned area and the second image of the second scanned area.

8. A method for elongation measurement of a workpiece during forging comprising:

acquiring a first image of a first scanned area having a first mark pattern on a side of the workpiece between a distal end of a first end of the workpiece and a prospective forging location before a forging blow;

acquiring a second image of a second scanned area having a second mark pattern on a side of the workpiece between a distal end of a second end of the workpiece and a prospective forging location before the forging blow;

acquiring a third image of a third scanned area including at least a portion of the first scanned area having the first mark pattern on a side of the workpiece between the distal end of the first end of the workpiece and a forging location during the forging blow;

acquiring a fourth image of a fourth scanned area including at least a portion of the second scanned area having a second mark pattern on a side of the workpiece between a distal end of the second end of the workpiece and a forging location during the forging blow;

determining the relative horizontal movement of the first end of the workpiece during the forging blow by correlating the horizontal position of the first mark pattern in the first image relative to the horizontal position of first mark pattern in the third image;

determining the relative horizontal movement of the second end of the workpiece during the forging blow by correlating the horizontal position of the second mark pattern in the second image relative to the horizontal position of the second mark pattern in the fourth image; and calculating the elongation of the workpiece during the forging blow wherein the elongation of the workpiece is the sum of the relative horizontal movement of the first end of the workpiece and the relative horizontal movement of the second end of the workpiece.

9. The method for elongation measurement of a workpiece during forging according to claim 8 further comprising the steps of:

determining the relative vertical movement of the first end of the workpiece during the forging blow by correlating the vertical position of the first mark pattern in the first image relative to the vertical position of first mark pattern in the third image;

determining the relative vertical movement of the second end of the workpiece during the forging blow by correlating the vertical position of the second mark pattern in the second image relative to the vertical position of the second mark pattern in the fourth image.

10. The method for elongation measurement of a workpiece during forging according to claim 9 further comprising the steps of:

acquiring a fifth image of a fifth scanned area including at least a portion of the first scanned area having the first mark pattern on a side of the workpiece between the distal end of the first end of the workpiece and the forging location during the forging blow;

acquiring a sixth image of a sixth scanned area including at least a portion of the second scanned area having a second mark pattern on a side of the workpiece between the distal end of the second end of the workpiece and the forging location during the forging blow;

determining the relative horizontal movement of the first end of the workpiece between the acquiring of the third image and the acquiring of the fifth image during the forging blow by correlating the horizontal position of the first mark pattern in the third image relative to the horizontal position of first mark pattern in the fifth image;

determining the relative horizontal movement of the second end of the workpiece during the forging blow by correlating the horizontal position of the second mark pattern in the fourth image relative to the horizontal position of the second mark pattern in the sixth image; and calculating the elongation of the workpiece from the acquiring of the third image and fourth image to the acquiring of the fifth image and sixth image during the forging blow wherein the elongation of the workpiece is the sum of the relative horizontal movement of the first end of the workpiece and the relative horizontal movement of the second end of the workpiece from the acquiring of the third image and fourth image to the acquiring of the fifth image and sixth image; and determining the relative vertical movement of the first end of the workpiece during the forging blow by correlating the vertical position of the first mark pattern in the third image relative to the vertical position of first mark pattern in the fifth image;

determining the relative vertical movement of the second end of the workpiece during the forging blow by correlating the vertical position of the second mark pattern in the fourth image relative to the vertical position of the second mark pattern in the sixth image.

11. A system for elongation measurement of a workpiece during forging comprising:

a means for:
  a) acquiring a first image of a first scanned area having a first mark pattern on a side of the workpiece between a distal end of a first end of the workpiece and a prospective forging location before a forging blow;
  b) acquiring a second image of a second scanned area having a second mark pattern on a side of the workpiece between a distal end of a second end of the workpiece and the prospective forging location before the forging blow;
  c) acquiring a third image of a third scanned area including at least a portion of the first scanned area having the first mark pattern on the side of the workpiece between the distal end of the first end of the workpiece and a forging location after the forging blow;
  d) acquiring a fourth image of a fourth scanned area including at least a portion of the second scanned area having the second mark pattern on the side of the workpiece between the distal end of the second end of the workpiece and the forging location after the forging blow;

a means for determining a relative horizontal movement of the first end of the workpiece by correlating a horizontal position of the first mark pattern in the first image relative to a horizontal position of the first mark pattern in the third image and determining a relative horizontal movement of the second end of the workpiece by correlating a horizontal position of the second mark pattern in the second image relative to a horizontal position of the second mark pattern in the fourth image; and for calculating an elongation of the workpiece wherein the elongation of the workpiece is a sum of the relative horizontal movement of the first end of the workpiece and the relative horizontal movement of the second end of the workpiece.

12. The system for elongation measurement of a workpiece during forging of claim 11 further comprising:

a means for:
  determining a relative vertical movement of the first end of the workpiece by correlating a vertical position of the first mark pattern in the first image relative to a vertical position of the first mark pattern in the third image; and
  determining a relative vertical movement of the second end of the workpiece by correlating a vertical position of the second mark pattern in the second image relative to a vertical position of the second mark pattern in the fourth image.

13. The system for elongation measurement of a workpiece during forging of claim 11 further comprising:

a means for determining a position and a size of the first scanned area and the second scanned area based on a workpiece height prior to acquiring the first image of the first scanned area and the second image of the second scanned area.

14. The method for elongation measurement of a workpiece during forging of claim 1 wherein determining the relative horizontal movement of the first end of the workpiece includes determining a length value that corresponds to a maximum correlation on a response curve that correlates image data of the first scanned area with that of the third scanned area, and determining the relative horizontal movement of the second end of the workpiece includes determining a length value that corresponds to a maximum correlation on a response curve that correlates image data of the second scanned area with that of the fourth scanned area.

15. The system for elongation measurement of a workpiece during forging of claim 11 wherein the means for determining the relative horizontal movement of the first end of the workpiece and the relative horizontal movement of the second end of the workpiece, determines a length value that corresponds to a maximum correlation on a response curve that correlates image data of the first scanned area with that of the third scanned area, and determines a length value that corresponds to a maximum correlation on a response curve that correlates image data of the second scanned area with that of the fourth scanned area.

* * * * *